Patented Nov. 7, 1950

2,529,209

UNITED STATES PATENT OFFICE 2,529,209

PURIFICATION OF ALKYL PHENOLS

Jackson J. Ayo, Elizabeth, and Ferdinand J. Gajewski, Linden, N. J., assignors to General Aniline & Film Corporation, New York, N. Y., a corporation of Delaware No Drawing. Application December 11, 1947, Serial No. 791,166

1 Claim. (Cl. 202—57)

This invention relates to a process of purifying alkylated phenols.

When higher alkylated phenols (i. e. phenols containing one or more alkyl substituents of four or more carbon atoms each) are employed as intermediates in the production of such products as resins by condensation with formaldehyde or surface active agents by condensation with alkylene oxides, the resulting product frequently has a relatively poor color, being decidedly yellow to dark brown in color, even though the alkylated phenol employed actually may have been very light in color. As a result, the use of such alkylated phenols has been considerably retarded and the value of products produced therefrom appreciably lowered in many applications where color is important, although technically the products obtained from higher alkylated phenols may be superior to other available products.

We have now discovered that such alkylated phenols may be readily purified and the color of the phenol itself and more especially the color of products produced therefrom markedly improved by simple vacuum distillation of the colored crude alkylated phenol, provided that a small amount of an alkali is admixed with the crude phenol prior to vacuum distillation and this mixture of alkali and phenol is heated to a temperature about 80° C. higher than that to be used for vacuum distillation, and the thus-treated mixture then distilled under vacuum at a temperature approximately 80° below that which was employed in the heat-treating step.

The phenols which may be purified by the process of the present invention include alkylated phenols which themselves have relatively poor colors and also those which are themselves light in color but from which products having relatively poor colors are produced. These phenols may be represented by the general formula:

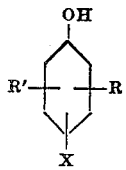

wherein R stands for an alkyl group of at least 4 carbon atoms, R' stands for hydrogen or a similar alkyl group and X stands for hydrogen or methyl, and as examples thereof may be mentioned such alkyl phenols as o- and p- normal, secondary and tertiary butyl phenols and cresols, o- and p- normal, secondary and tertiary amyl phenols and cresols, 2,4-diamyl and dibutyl phenols and cresols, iso-octyl phenols and cresols, dodecyl phenols and cresols, pentadecyl phenols and cresols, octadecyl phenols and cresols, and similar alkyl phenols and cresols obtained by condensing with the aid of an acid condensing catalyst such as sulfuric acid or $BF_3$ olefines such as those obtained in petroleum refining, for instance butylene and isobutylene and dimers and trimers thereof, 6–18 carbon atom polypropylenes and the like with phenol or cresols; also the alkyl phenols obtained by the condensation of aliphatic alcohols, especially secondary and tertiary alcohols containing 4 to 18 carbon atoms such as secondary or tertiary amyl and butyl alcohols, dodecanol, octadecanol or alcohols obtained by oxidation of paraffin waxes and the alcohols obtained by the Fischer-Tropsch process with phenol and cresols with the aid of such acid reacting condensation catalysts as $H_2SO_4$ or $BF_3$, so as to introduce into the phenol or cresol one or two alkyl groups containing 4 to 18 carbon atoms.

The details of the present invention can be most readily described by consideration of a specific example of a preferred embodiment thereof.

Example 600 g. of diamyl phenol were mixed in a distillation flask with 6 g. of solid potassium hydroxide and the mixture heated at atmospheric pressure to 220° C. for 15 minutes. The mixture was then cooled to about 100° C. and a vacuum applied to the flask and the phenol was then distilled under pressure of 3–4 mm. The main fraction boiling at 125–140° C. was collected. This fraction was then mixed with a small amount of alkali (potassium hydroxide) and ethylene oxide passed into the same at a temperature of about 150° C. to form the water-soluble, surface active polyglycol ether of the diamyl phenol. The introduction of ethylene oxide was continued until 8 to 10 mols of ethylene oxide had been introduced for each mol of the phenol, at which time a test sample was readily soluble in water. The thus-obtained water-soluble polyglycol ether of diamyl phenol had a reading of 2 on the Varnish Color System of the Institute of Paint and Varnish Research, whereas a similar polyglycol ether produced from the same batch of diamyl phenol which had been vacuum-distilled but which had not been subjected to the high temperature alkali treatment prior thereto had a color reading of 9 or higher on the same scale.

It will be understood that the foregoing example is illustrative only of a specific embodiment of the present invention and various changes may be made therein. Thus, it will be noted that the temperature employed will, of course, depend on the specific phenol being purified and on the degree of vacuum employed for final distillation. The particular temperature and vacuum to be employed for any specific phenol can, of course, be readily determined from usual reference tables in many instances or by simple preliminary experiment. The essential feature of the present invention, insofar as temperature is concerned, is the employment during the preliminary alkali heat-treating step of a temperature approximately 80° C. higher than the temperature to be employed during vacuum distillation. Superatmospheric pressure, of course, may be employed during this preliminary heating step, if necessary.

It will also be apparent that other alkali metal alkalies may be employed in place of potassium hydroxide and thus, sodium hydroxide or potassium or sodium carbonate may be used, if desired. It has been found that about 1% by weight of alkali is effective for obtaining a marked improvement in color of the products produced from the alkylated phenols. Too much alkali should not be employed, since the phenolate of the phenol will be formed and an excess of alkali may therefore result in some loss of phenol. The optimum amount of alkali can, of course, be readily determined by simple preliminary test.

We claim:

In the purification of higher alkylated phenols containing an alkyl substituent of at least 4 carbon atoms by vacuum distillation at a predetermined temperature, the improvement which comprises mixing said phenol prior to distillation with about 1% by weight thereof of an alkali and heating said mixture to a temperature about 80° C. higher than said predetermined vacuum distillation temperature for about 15 minutes and thereafter cooling said mixture and vacuum distilling said phenol at said predetermined temperature.

JACKSON J. AYO.
FERDINAND J. GAJEWSKI.

REFERENCES CITED

The following references are of record in the file of this patent:

UNITED STATES PATENTS

| Number | Name | Date |
|---|---|---|
| 2,302,600 | Cislak | Nov. 17, 1942 |

OTHER REFERENCES

Industrial and Engineering Chemistry, vol. 39, pp. 525 and 527 (Apr. 1947). (Copy in Scientific Library).